United States Patent [19]
Fukutani et al.

[11] 3,923,703
[45] Dec. 2, 1975

[54] PROCESS FOR PREPARING PHOTOSENSITIVE POLYMER

[75] Inventors: Hideo Fukutani, Tokyo; Konoe Miura, Yokohamo; Chihiro Eguchi, Yokohoma; Yoshihiro Takahashi, Yokohama; Kazuo Torige, Yokohama; all of Japan

[73] Assignee: Mitsubishi Chemical Industries Ltd., Tokyo, Japan

[22] Filed: Feb. 8, 1974

[21] Appl. No.: 440,770

[30] Foreign Application Priority Data
Mar. 3, 1973 Japan.............................. 48-25270

[52] U.S. Cl........... 260/2 A; 260/87.1; 260/88.3 A; 260/89.5 S; 260/91.1 S; 260/92.8 A; 204/159.14; 204/159.18; 96/35.1; 96/115 R
[51] Int. Cl.².................C08F 120/22; C08F 114/06; C08F 124/00
[58] Field of Search........ 260/78.4 D, 75 A, 92.8 A, 260/2 A, 89.5 S, 88.3 A, 91.1 S

[56] References Cited
UNITED STATES PATENTS
3,817,876  6/1974  Fukutani et al................ 260/92.8 A FOREIGN PATENTS OR APPLICATIONS
1,491,791  7/1967  France OTHER PUBLICATIONS
Chemical Abstracts, Vol. 62, 1965, 14498a.

*Primary Examiner*—Joseph L. Schofer
*Assistant Examiner*—Maria S. Tungol
*Attorney, Agent, or Firm*—Oblon, Fisher, Spivak, McClelland & Maier

[57] ABSTRACT

A process for preparing a photosensitive polymer which comprises reacting a polymer having an active halogen with an α,β-unsaturated carboxylic acid having the formula:

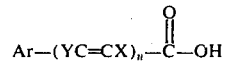

wherein X and Y represent a hydrogen atom, halogen atom, cyano group, or nitro group, Ar represents an aryl group, n is 1 or 2; in the presence of a bicyclic amidine.

10 Claims, No Drawings

PROCESS FOR PREPARING PHOTOSENSITIVE POLYMER

BACKGROUND OF THE INVENTION

1. Field of the Invention

This invention relates to a process for preparing a photosensitive polymer. More particularly, it relates to a process for preparing a photosensitive polymer by reacting a polymer having an active halogen atom with an unsaturated carboxylic acid such as cinnamic acid.

2. Description of Prior Art

It is known that cinnamic acid and derivatives thereof may be photodimerized. It is also known that photosensitive polymers prepared by reacting cinnamic acid with polyvinyl alcohol or cellulose, can be cross-linked by irradiation with light to form solvent insoluble polymers, and that these polymers have been used in various fields.

On the other hand, it has been proposed to introduce a cinnamic acid residual group into a polyether type polymer so as to impart high mechanical property and solvent resistivity to the polymer.

There are presently two types of methods for the preparation of these photosensitive polymers:

A homopolymerization or copolymerization of a polymerizable monomer having the photosensitive group; and A substitution of the photosensitive group in a polymer having an active group to which the photosensitive group can be introduced.

This invention relates to the preparation of a photosensitive polymer by a polymer reaction.

Previously, the inventors had proposed the following process for reacting a cinnamic acid group or the like with a polymer having a halogen atom to introduce the cinnamic acid group into the polymer.

The polymer having a halogen atom is reacted with a salt of an $\alpha,\beta$-unsaturated carboxylic acid having the formula:

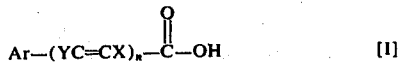   [I]

wherein X and Y represent a hydrogen atom, a halogen atom, a cyano group or a nitro group, Ar represents an aryl group and $n$ represents an integer of 1 or 2, in a polar solvent.

The term aryl is intended to include both unsubstituted aryl groups and those aryl groups substituted by inert substituents.

The cation for forming the salt may be from a metallic salt such as a K, Na, or Li salt or a quaternary ammonium salt such as tetraethyl ammonium, tetramethyl ammonium, trimethylbenzyl ammonium, or the like.

However, this process has the following disadvantages:

First, the reaction conditions are difficult to control because the reaction system is heterogeneous. It is very important to precisely control the reaction conditions because the photosensitive properties of the polymer usually vary depending upon the degree of substitution of the halogen atom by the cinnamic group in the polymer. Therefore, the reaction must be controlled to control the degree of substitution. Accordingly, the fact that it is difficult to control the reaction is a serious disadvantage.

Second, the salt of an $\alpha,\beta$-unsaturated carboxylic acid must be first prepared or the $\alpha,\beta$-unsaturated carboxylic acid and a hydroxide of the base is added, however, the water formed by this reaction must be removed since the reaction is adversely affected by the presence of a protonic material, such as water. That is, the reaction velocity is decreased by the presence of water. It is therefore desirable to eliminate this difficulty.

Third, it is undesirable for the photosensitive polymer to contain an alkali metal (even though it is present only in ppm) when the photosensitive polymer is used in the electronics field. When the salt of an $\alpha,\beta$-unsaturated carboxylic acid contains a cation of K, Na or Li, the photosensitive polymer prepared from the acid salt contains the cation resulting in a disadvantageous affect on the electric characteristics of the photosensitive polymer.

A need exists, therefore, for a process for preparing a photosensitive polymer which overcomes the aforementioned disadvantages.

SUMMARY OF THE INVENTION

Accordingly, one object of the invention is to provide a process for preparing a photosensitive polymer containing no contamination.

Another object is to provide a process for preparing a photosensitive polymer under easily controlled conditions without difficulty.

Briefly, these and other objects of the invention as hereinafter will become apparent, are achieved by preparing a photosensitive polymer by reacting a polymer having an active halogen atom with an $\alpha,\beta$-unsaturated carboxylic acid in an aprotic polar solvent in the presence of a bicyclic amidine.

DETAILED DESCRIPTION OF THE PREFERRED EMBODIMENTS

A polymer having an active halogen atom is reacted with an $\alpha,\beta$-unsaturated carboxylic acid having the formula [I] in an aprotic polar solvent, in the presence of a bicyclic amidine (diazabicyclic alkene) having the formula [II]

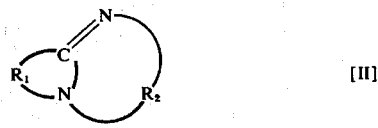   [II]

wherein $R_1$ represents a $C_{1-11}$ alkylene group which is unsubstituted or which is substituted with an inert group such as lower alkyl group and $R_2$ represents a propylene group which can be substituted with an inert group such as lower alkyl group.

Suitable polymers having an active halogen atom can be any of the well known polymers conventionally used to prepare photopolymers, but, preferably include the halogen containing polyethers such as homopolymers of a halogen containing epoxy compound such as epichlorohydrin, epibromohydrin, 1,2-dichloro-3,4-epoxybutane; 1,1-dichloro-2,3-epoxypropane; 3,3-bis(chloromethyl) oxetane; 3, 3-bis(bromomethyl) oxetane; or the like.

Copolymers formed by copolymerizing the above halogen containing epoxy compounds with an alkyleneoxide such as ethyleneoxide, propyleneoxide, butyleneoxide; or an epoxyether such as methylglycidylether or phenylglycidylether; or an oxetane (trimethyleneoxide) such as oxetane, 3-methyloxentane, or 3,3-dimethyloxetane or an epoxy compound such as styreneoxide or the like may also be used.

The polymers also include halogen containing vinyl polymers such as polyvinylchloride, copolymers of vinylchloride-vinylacetate; polymers of vinylethers such as β-chloroethylvinylether; or acryl polymers such as 2-chloroethyl acrylate or the like.

However, polymers having an active halogen atom are preferably used in the process of this invention.

Suitable α,β-unsaturated carboxylic acids having formula [I] include, for example, cinnamic acid, cinnamylidene acetic acid, β-nitrocinnamic acid, α-cyanocinnamic acid, β-(1)-naphthylacrylic acid, β-(9)-anthryl acrylic acid or β-(2)-furfuryl acrylic acid or the like.

Bicyclic amidines having formula [II], wherein $R_1$ represents $C_{1-11}$ alkylene group or a lower alkyl, especially methyl, substituted $C_{1-12}$ alkylene group; and $R_2$ represents a propylene group or a lower alkyl, especially methyl, substituted propylene group may be used.

Suitable bicyclic amidines include 1,5-diazabicyclo [4.2.0]octene-5; 1,5-diazabicyclo [4.3.0] nonene-5; 1,5-diaza-3,methylbicyclo-[4.3.0] nonene-5; 1,5-diazabicyclo [4.4.0] decene-5; 1,5-diaza-10-methylbicyclo [4.4.0] decene-5; 1,8-diazabicyclo [5.4.0] undecene-7 (hereinafter referred to as DBU); 1,9-diazabicyclo [6.4.0] dodecene-8; 1,10-diazabicyclo [7.4.0] tridecene-9; 1,14-diazabicyclo [11.4.0] heptadecene-13; or the like.

It is especially preferred to use a compound wherein $R_1$ represents a $C_{3-5}$ alkene group.

The bicyclic amidines are usually prepared by reacting a lactam having 1 – 12 carbon atoms with acrylonitrile.

In the process of this invention, it is necessary to react the polymer having an active halogen atom with the α,β-unsaturated carboxylic acid in an aprotic solvent in the pre;sence of the bicyclic amidine.

Suitable aprotic solvents include dimethylformamide, diethylformamide, dimethylacetoamide, tetramethylurea, dimethylsulfoxide, hexamethylphosphoric triamide, N-methylpyrrolidone, or the like.

There are various methods for providing the bicyclic amidine into the reaction of the polymer having an active halogen atom with the α,β-unsaturated carboxylic acid. For example, the polymer having an active halogen atom may be dissolved in the aprotic polar solvent and then the α,β-unsaturated carboxylic acid and the bicyclic amidine are dissolved therein or, the α,β-unsaturated carboxylic acid may be reacted with the bicyclic amidine to form the salt, and then the salt is added to the solution of the polymer having an active halogen atom in the aprotic polar solvent. The α,β-unsaturated carboxylic acid and the bicyclic amidine may be dissolved in the aprotic polar solvent and then the polymer having an active halogen atom is dissolved in this solution.

The amount of bicyclic amidine used may vary over wide limits and depends upon the desired results, however, it is preferable to use about an equimolar ratio of bicyclic amidines to the α,β-unsaturated carboxylic acid.

The reaction is usually conducted at a temperature of from room temperature to 100°C in an inert gas atomosphere. It is not desirable to conduct the reaction at a temperature higher than 100°C because of the possibility of gelation of the photosensitive polymer. After completion of the reaction, the reaction mixture is poured into a solvent which has a low solubility for the polymer, to precipitate the photosensitive polymer.

In accordance with the process of this invention, a photosensitive polymer may be obtained in which a portion or most of the active halogen atom of the polymer is substituted with the α,β-unsaturated carboxylic acid residual group.

In accordance with the process of this invention, it is also possible to easily prepare a photosensitive polymer having excellent stability properties since the reaction system is completely homogeneous so that the reaction is easily controlled.

Since no water is obtained in the reaction system, the disadvantageous affect associated with water is not observed. Moreover, the photosensitive polymer is not contaminated with an alkali metal compound.

Even though a small amount of the bicyclic amidine is included in the photosensitive polymer, this has little affect on the electrical characteristic as compared to the contamination affect of the alkali metal compound.

Photosensitive compositions can be prepared by dissolving the photosensitive polymer of the invention in a suitable solvent such as chlorobenzene, xylene, methylcellosolve acetate, ethylcellosolve acetate, pentoxone, or the like and adding a conventional sensitizer such as picramide, nitronaphthalene, 5-nitroacenaphthene, 2-nitrofluorene, benzophenone, Michler's ketone, naphthoquinone, anthraquinone, 2,3-diphenylanthraquinone, benzathrone, or the like. If necessary, a stabilizer, such as hydroquinone, t-butylcatechol; a plasticizer such as triacetin, triethyleneglycol dipropionate, various dyes and pigments may also be added.

The photosensitive compositions can be used for various applications. For example, they may be used as photoresists for the preparation of printed circuits, for the preparation of IC, for chemical milling, for printing plates for relief printing and intaglio processes and for photoprinting plates. They can be also used as a photocurable paint or as photoadhesives.

Having now generally described the invention, a more complete understanding can be obtained by reference to certain specific examples, which are included for purposes of illustration only and are not intended to be limiting unless otherwise specified.

EXAMPLE 1

10 g of polyepichlorohydrin having a reduced specific viscosity $\eta SP/C = 0.97$ (0.2 g/dl benzene sol. at 30°C) was dissolved in 342 ml of dimethylformamide and 20.8 g of cinnamic acid and 21.4 g of DBU were added. A homogenous solution was formed. The reaction was conducted at 85°C for 10 hours with stirring in an argon atmosphere. The reaction mixture always remained homogenous.

A part of the reaction mixture was removed and the amount chlorine ion formed by the reaction was measured with silver nitrate by a potentionmetric titration method. It was found that 58% of the chlorine atoms of the polyepichlorohydrin was replaced with cinnamic acid radicals.

The reaction mixture was then poured into about 2l of methanol to precipitate the polymer and the cake polymer was cut and washed with methanol and then dried. The infrared spectrum and elementary analysis of the resulting polymer showed that the polymer has the following formula:

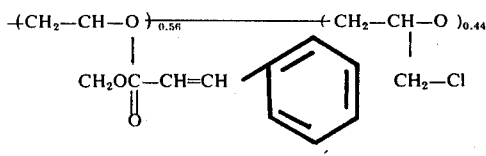

EXAMPLE 2

2.5 g of polyepichlorohydrin ($\eta SP/C = 1.05$) was dissolved in 81.2 m of N-methylpyrrolidone and 5.2 g of cinnamic acid and 5.3 g of DBU were added and the reaction was conducted at 80°C for 7.5 hours as described in Example 1. 47% of the chlorine atoms of the polyepichlorohydrin were replaced with cinnamic acid radicals.

EXAMPLE 3

The process of Example 1 was repeated using the same conditions except that an excess of 1,5-diazabicyclo [4.3.0] nonene-5 was used instead of DBU. 54% of the chlorine atoms of the polyepichlorohydrin were replaced with cinnamic acid radicals.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing a photosensitive polymer which comprises reacting
    a. a polymer having an active halogen atom selected from the group consisting of halogen-containing polyethers, copolymers of halogen-containing polyethers with epoxy compounds, halogen-containing vinyl polymers and acryl polymers;
    b. with an $\alpha,\beta$-unsaturated carboxylic acid having the formula

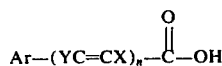

wherein X and Y represent a hydrogen atom, a halogen atom, a cyano group or a nitro group; Ar represents an aryl group and $n$ represents an integer of 1 or 2;
    c. in the presence of a bicyclic amidine having the formula

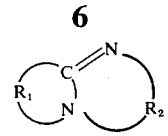

wherein $R_1$ represents a $C_{1-11}$ alkylene group which can be substituted by an inert group and $R_2$ represents a propylene group which can be substituted by an inert group;
    d. in an aprotic polar solvent;
the reaction being carried out in a homogeneous reaction system.

2. The process for preparing a photosensitive polymer of claim 1, wherein $R_1$ is a $C_{1-11}$ alkylene group or a lower alkyl substituted $C_{1-11}$ alkylene group and $R_2$ is a propylene group or a lower alkyl substituted propylene group.

3. The process for preparing a photosensitive polymer of claim 2, wherein $R_1$ is a $C_{1-11}$ alkylene group or a methyl $C_{1-11}$ alkylene group; and $R_2$ is a propylene group or a methyl propylene group.

4. The process for preparing a photosensitive polymer of claim 1 wherein 5 - 100 % of the active halogen atom in said polymer are replaced with the $\alpha,\beta$-unsaturated carboxylic radical.

5. The process for preparing a photosensitive polymer of claim 1, wherein the molar ratio of the bicyclic amidine to the $\alpha,\beta$-unsaturated carboxylic acid is from 0.1 to 10.

6. The process of claim 1, for preparing a photosensitive polymer of claim 1, wherein the molar ratio of the bicyclic amidine to the $\alpha,\beta$-unsaturated carboxylic acid is from 0.5 to 5.

7. The process for preparing a photosensitive polymer of claim 1, wherein said bicyclic amidine is added together with the $\alpha,\beta$-unsaturated carboxylic acid in a solution of the polymer having an active halogen atom in the aprotic polar solvent.

8. The process for preparing a photosensitive polymer of claim 1, wherein the reaction is conducted at a temperature of from room temperature to 100°C in a homogeneous condition.

9. The process for preparing a photosensitive polymer of claim 1 said bicyclic amidine and the $\alpha,\beta$-unsaturated carboxylic acid are dissolved in the solvent and the polymer having an active halogen atom is added in the resulting solution.

10. The process for preparing a photosensitive polymer of claim 1, wherein the bicyclic amidine is selected from the group consisting of 1,5-diazabicyclo [4.3.0] nonene-5; 1,5-diaza-3-methylbicyclo [4.3.0] nonene-5; 1,5-diazabicyclo [4.4.0] decene-5; 1,5-diaza-10-methylbicyclo [4.4.0] decene-5; 1,8-diazabicyclo [5.4.0] undecene-7; 1,9 -diazabicyclo [6.4.0] dodecene-8; 1, 10-diazabicyclo [7.4.0] tridecene-9; and 1,14-diazabicyclo [11.4.0] heptadecene-13;

* * * * *